UNITED STATES PATENT OFFICE.

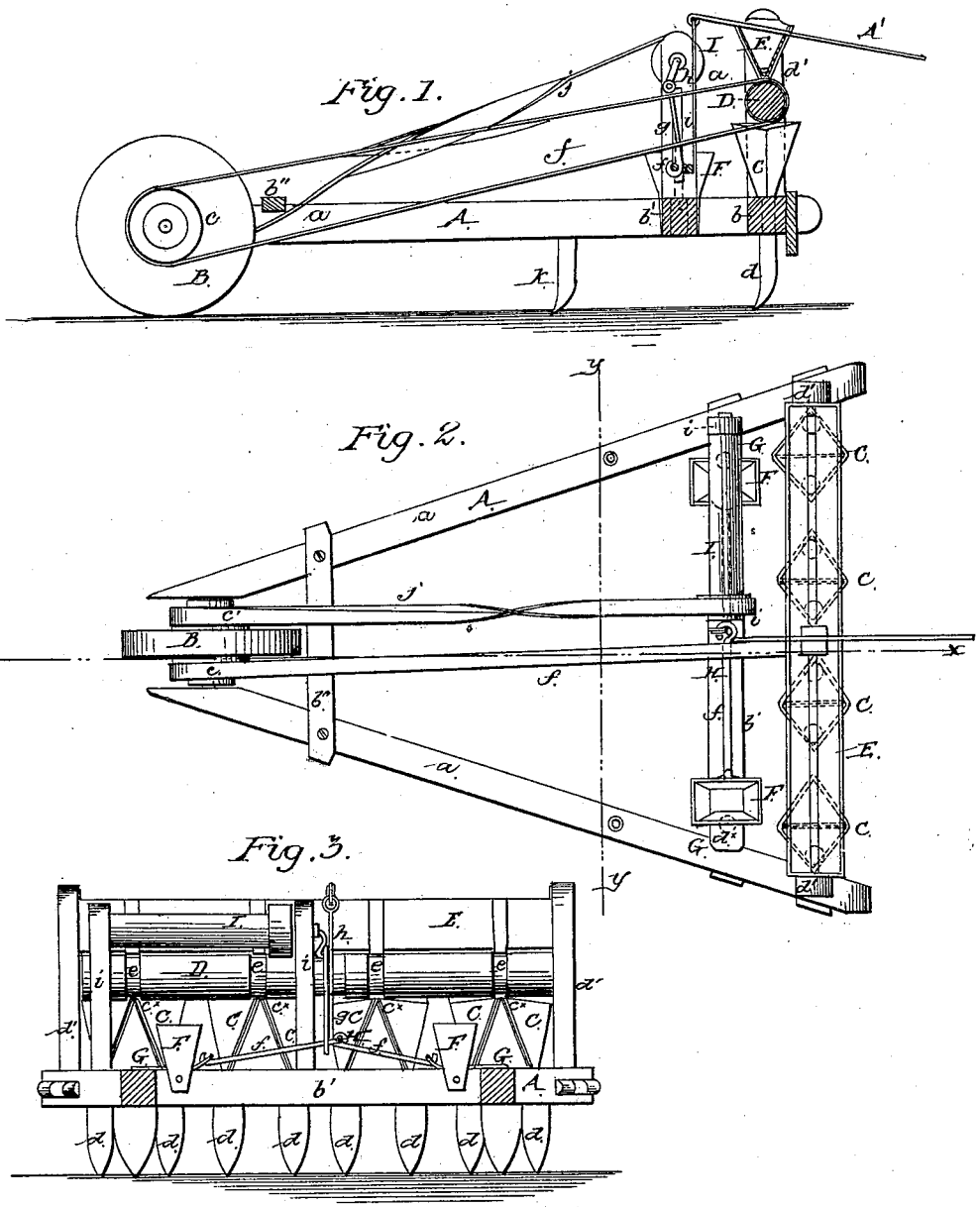

U. H. SHOCKLEY, OF LITCHFIELD, ILLINOIS.

IMPROVEMENT IN SEEDING-MACHINES.

Specification forming part of Letters Patent No. 37,776, dated February 24, 1863.

*To all whom it may concern:*

Be it known that I, U. H. SHOCKLEY, of Litchfield, in the county of Montgomery and State of Illinois, have invented a new and Improved Seeding-Machine; and I do hereby declare that the following is a full, clear, and exact description of the same, reference being had to the accompanying drawings, making a part of this specification, in which—

Figure 1 is a side sectional view of my invention, taken in the line $x\,x$, Fig. 2. Fig. 2 is a plan or top view of the same; Fig. 3, a transverse vertical section of the same, taken in the line $y\,y$, Fig. 2.

Similar letters of reference indicate corresponding parts in the several figures.

To enable those skilled in the art to fully understand and construct my invention, I will proceed to describe it.

A represents a frame, which is formed of two oblique side pieces, $a\,a$, connected by traverse-bars $b\,b'\,b''$, and supported at its front end by a wheel, B, which has a pulley attached to each side of it, designated by $c\,c'$.

To the back traverse-bar, $b$, there are attached a series of teeth or shares, $d$, the shanks of which are hollow or tubular, and extend up through the back traverse-bar, $b$, to receive the lower ends of hoppers C, which are connected together in pairs at their upper ends, as shown at $c^\times$ in Fig. 3.

On the back part of the frame A there are two uprights, $d'\,d'$, in which the journals of a shaft, D, are fitted. This shaft D is grooved circumferentially at points directly over the junction of each pair of hoppers, as shown at $e$, each groove $e$ projecting over the hopper of each pair. (See Fig. 3.)

Between the two uprights $d\,d$ and directly over the shaft D there is placed a seed-box, E, the bottom of which is formed by the shaft D, as shown in Fig. 1. The shaft D is rotated by a belt, $f$, from the pulley $c$.

On the traverse-bar $b'$, just in front of the back one, $b$, there are placed two seed-boxes, F F, one near each end, and underneath each seed-box F there is fitted a slide, G. These slides G G rest on the traverse-bar $b'$, and each is perforated with a hole, $d^\times$. The bar $b'$ is also perforated with a hole, $e^\times$, near each seed-box F. The slides G G are connected at their inner ends to arms $f\,f$, which form a toggle, H, said arms being connected at their inner ends to the lower end of a rod, $g$, the upper end of which is fitted on a crank, $h$, at the inner end of a shaft, I, the bearings of which are in the upper parts of uprights $i\,i$, one upright being attached to the traverse-bar $b'$ and the other to one of the oblique bars $a$. The shaft I is driven by a belt, $j$, from the pulley $c'$.

To each oblique bar $a$ there is attached a tooth or share, $k$, and these teeth or shares are in line with the holes $e^\times$ of the bar $b'$.

The operation is as follows: If it is designed to sow seed in drills, the seed-box E is supplied with the same; and as the machine is drawn along the shaft D is rotated from the pulley $c$ by the belt $f$, and the seed is discharged from the box E by the grooves $e$ into the hoppers C, which convey it into the shanks of the teeth or shares $d$, and from thence it drops into the furrows made by the teeth or shares.

In sowing seed in hills the boxes F F are supplied with the seed, and, the shaft I being rotated by the belt $j$ from pulley $c'$, the crank $h$ and rod $g$ will operate the toggle H, and the slides G G will have a reciprocating motion communicated to them, and the holes $d^\times$ of said slides, when within the boxes F, will become filled with seed, which, when the holes $d$ come in line or register with the holes $e^\times$ in the traverse-bar $b'$, pass through the holes $e$ and drop in the furrows made by the teeth or shares $k$. This toggle arrangement forms a simple and efficient means for operating the seed-slides G G, and in consequence of both seed-distributing devices being operated by the rotation of two shafts, D I, either may be used, as desired. All that is required to render either inoperative is the casting off of the belt which drives it. In case small seeds are to be sown simultaneously with those grown in hills, both seed-distributing devices are used simultaneously.

I would remark that a lever, A', may be attached to the hopper E and connected by a rod, $a^\times$, to the toggle H, as shown clearly in Fig. 1, in order that the slides G may be operated at any time by hand when necessary.

I do not claim separately a seed-distributing device formed of a shaft grooved circumferentially, for that has been previously used; but I do claim as new and desire to secure by Letters Patent—

The combination, in the manner herein shown and described, of the shaft I, toggle H, the seed-slides G G, and lever A', with the shaft D, hoppers C, supporting-wheel B, pulleys c c, and frame A, all as herein set forth.

U. H. SHOCKLEY.

Witnesses:
GEORGE M. RAYMOND,
LEWIS WHITAKER.